US012543663B2

(12) United States Patent
Hong

(10) Patent No.: US 12,543,663 B2
(45) Date of Patent: Feb. 10, 2026

(54) PLANT CULTIVATOR

(71) Applicant: LG ELECTRONICS INC., Seoul (KR)

(72) Inventor: Sangpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/723,563

(22) PCT Filed: Aug. 30, 2022

(86) PCT No.: PCT/KR2022/012944
§ 371 (c)(1),
(2) Date: Nov. 5, 2024

(87) PCT Pub. No.: WO2023/128124
PCT Pub. Date: Jul. 6, 2023

(65) Prior Publication Data
US 2025/0380647 A1 Dec. 18, 2025

(30) Foreign Application Priority Data

Dec. 27, 2021 (KR) .................. 10-2021-0189062

(51) Int. Cl.
A01G 9/24 (2006.01)
(52) U.S. Cl.
CPC .................... A01G 9/249 (2019.05)
(58) Field of Classification Search
CPC ..................................... A01G 9/249
See application file for complete search history.

(56) References Cited

U.S. PATENT DOCUMENTS

| | | | |
|---|---|---|---|
| 2009/0086470 A1* | 4/2009 | Schafer | F21V 21/22 362/122 |
| 2010/0031566 A1* | 2/2010 | Azoulay | A01G 9/247 47/60 |
| 2020/0318276 A1 | 10/2020 | Booth | |

FOREIGN PATENT DOCUMENTS

| | | | | |
|---|---|---|---|---|
| CN | 107072159 | | 8/2017 | |
| DE | 102023127267 B3 | * | 2/2025 | ............. A01G 9/247 |
| EP | 4620293 A1 | * | 9/2025 | ............... A01G 9/16 |

(Continued)

OTHER PUBLICATIONS

Korean Office Action dated Jun. 24, 2025 issued in Application No. 10-2021-0189062.

(Continued)

Primary Examiner — Monica L Perry
(74) Attorney, Agent, or Firm — KED & ASSOCIATES

(57) ABSTRACT

The present invention relates to a plant cultivator in which the height of a light can be adjusted and which can accommodate a means for adjusting the height of the light. The plant cultivator according to the present invention comprises: a main body part; a water tank part storing water and resting on the main body part; a handle part disposed above the water tank part and emitting light; a spacer connecting the handle part and the main body part; and a storage part provided below the main body part to accommodate the spacer. The storage part includes: a storage body having a spacer accommodation part in which the spacer is accommodated; and a storage cover detachably coupled to the lower side of the storage body to open and close the spacer accommodation part.

9 Claims, 11 Drawing Sheets

(56) References Cited

FOREIGN PATENT DOCUMENTS

| JP | 2014-000023 | 1/2014 | | |
|----|-------------|--------|---|---|
| KR | 10-2012-0060096 | 6/2012 | | |
| KR | 20-2014-0001506 | 3/2014 | | |
| KR | 10-2014-0078183 | 6/2014 | | |
| KR | 10-2016-0065236 | 6/2016 | | |
| KR | 10-2019-0064058 | 6/2019 | | |
| KR | 20240145267 A * | 10/2024 | ............. | A01G 9/246 |
| WO | WO-2015025409 A1 * | 2/2015 | ............. | A01G 9/16 |
| WO | WO-2023102130 A1 * | 6/2023 | ............. | A01G 18/00 |

OTHER PUBLICATIONS

International Search Report (with English Translation) and Written Opinion dated Dec. 8, 2022 issued in Application No. PCT/KR2022/012944.

* cited by examiner

PLANT CULTIVATOR

TECHNICAL FIELD

The present invention relates to a plant cultivator, and more particularly, to a plant cultivator in which a height of lighting device is adjustable, and a means for adjusting the height of the lighting device is accommodated.

BACKGROUND ART

Recently, consumer interest in and demand for eco-friendly crops has been rapidly increasing.

In order to meet the interest and demand of such users, technologies and products related to home plant cultivators that may easily and directly cultivates plants such as vegetables at home are being developed.

In general, the method to grow plants at home is to fill a container such as an open-top pot with culture soil, plant various seeds or plants in the culture soil, and supply moisture at regular intervals so as to provide environments (lighting, ventilation, etc.) necessary for cultivating the plant.

However, not only is it very cumbersome to create the environments for cultivating plants using potting soil at home, but it is also not easy to obtain suitable potting soil.

As an alternative to the traditional cultivation method using the culture soil, the proportion of plant cultivators applying a hydroponic cultivation method using water mixed with a culture medium suitable for home use is gradually increasing.

In general, home plant cultivators using the hydroponic cultivation method may be divided into a closed type, in which the cultivation environments in which plants are cultivated are formed as a sealed room inside the cultivation room, and an open type, in which the cultivation environments are exposed as it is to the room.

Regarding an open-type plant cultivator, a configuration of a plant cultivator including a hydroponic cultivation part, a base part supporting the hydroponic cultivation part, and a lighting device that irradiates light to the hydroponic cultivation part is disclosed in Japanese Patent Laid-Open No. 2014-000023 (prior document).

Light is energy inducing photosynthesis that is a main metabolic function of plants, and thus, a lighting device plays an important role in plant cultivation. The lighting device needs to be adjusted so as to provide appropriate light as the plant is grown.

However, the plant cultivator disclosed in the prior document has a problem in that the adjustment in height of the lighting device is limited, and a direction of light irradiation is changed when the height of the lighting device is adjusted, making it impossible to provide an appropriate arrangement of the lighting device according to the growth of the plant.

DISCLOSURE OF THE INVENTION

Technical Problem

A first object of the present invention is to provide a plant cultivator provided with a lighting device having an adjustable lighting.

A second object of the present invention is to provide a plant cultivator in which a means configured to adjust a height of a lighting device is accommodated.

The objects of the present invention are not limited to the aforementioned object, but other objects not described herein will be clearly understood by those skilled in the art from descriptions below.

Technical Problem

A plant cultivator according to the present invention includes: a cultivation pot part; a main body part on which the cultivation pot part is detachably disposed; a lighting device part configured to irradiate light toward the cultivation pot part; a housing disposed above the main body part and configured to accommodate the lighting device part; a spacer having one end detachably connected to the housing and the other end detachably connected to the main body part; and a spacer accommodation part disposed below the main body part, wherein the spacer accommodation part has an opened bottom surface and is configured to accommodate the spacer that is separated from the housing and the main body part.

In addition, the plant cultivator may further include a storage cover detachably coupled to the spacer accommodation part and configured to open and close the spacer accommodation part.

In addition, the spacer may be mounted on the storage cover.

In addition, the spacer may include a pair of spacer inserts protruding from one end of the spacer, and the storage cover may include an insert hook coupled to the spacer inserts.

In addition, the pair of spacer inserts may extend in a longitudinal direction of the spacer from one end of the spacer, and the insert hook may be inserted between the pair of spacer inserts.

In addition, the storage cover may further include a spacer protrusion inserted into the other end of the spacer.

In addition, the storage cover may further include a cover base on which the spacer is seated, the spacer may include a spacer body extending between the one end and the other end in a longitudinal direction to define an outer appearance of the spacer, and a top surface of the cover base may be at least partially aligned with an outer surface of the spacer body.

In addition, a cross-section of the outer surface of the spacer body in a direction perpendicular to the longitudinal direction may include a parabolic shape, and a cross-section of the top surface of the cover base in the direction perpendicular to the longitudinal direction may have a parabolic shape.

In addition, a cross-section of a top surface of the spacer accommodation part in the direction perpendicular to the longitudinal direction may have a parabolic shape.

Advantageous Effects

According to the plant cultivator of the present invention, one or more of the following effects may be achieved.

First, there may be the advantage of being able to adjust the height of the lighting device according to the growth of the plant.

Second, there may also be the advantage of being able to accommodate the spacer inside so as to adjust the height of the lighting device.

Third, there may also be the advantage that the spacer is capable of being accommodated even when the water is stored in the water tank.

Fourth, there may also be the advantage of preventing the water from reaching the power socket as much as possible when accommodating the spacer.

The effects of the present invention are not limited to the aforementioned effects, but other objects not described herein will be clearly understood by those skilled in the art from descriptions below.

MODE FOR CARRYING OUT THE INVENTION

Figure 1:
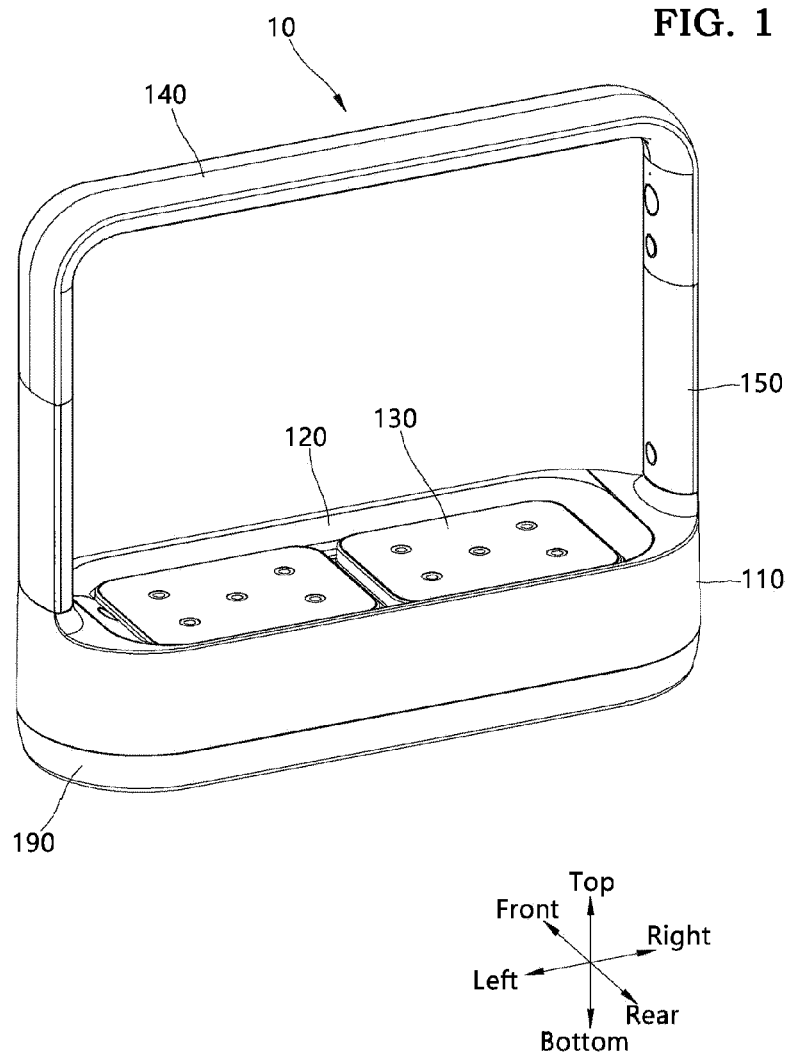
FIG. 1 is a rear perspective view of a plant cultivator according to an embodiment of the present invention.

The above-described objects, features, and advantages will be described in detail later with reference to the attached drawings, so that those skilled in the art will be able to easily implement the technical idea of the present invention. In descriptions of embodiments of the present invention, detailed descriptions related to the well-known technologies will be ruled out in order not to unnecessarily obscure subject matters of the present invention. Preferred embodiments of the inventive concept will be described below in more detail with reference to the accompanying drawings. In the drawings, the same reference numerals are used to denote the same or similar elements.

It will be understood that although the terms of first and second are used herein to describe various components, these components should not be limited by these terms. These terms are only used to distinguish one component from another component, and unless specifically stated to the contrary, the first component may also be a second component.

Throughout the specification, unless otherwise stated, each component may be singular or plural.

Hereinafter, the "upper portion (or lower portion)" of a component or the arrangement of any component on the "upward (or downward)" of a component means that any component is placed to be in contact with the top surface (or bottom surface) of the component. Additionally, it may mean that other components may be interposed between the component and any component disposed above (or below) the component.

In addition, when a component is described as being "linked," "coupled," or "connected" to another component, the components may be directly connected or connected to each other, but the other component is "interposed" between each component. It should be understood that "or, each component may be "linked," "coupled," or "connected" through other components.

As used herein, singular expressions include plural expressions unless the context clearly dictates otherwise. In the present application, the terms such as "consists of" or "includes" should not be construed as necessarily including all of the various components or steps described in the specification, and it should be interpreted that some of the components or steps may not be included, or additional components or steps may be included.

In addition, as used herein, singular expressions include plural expressions, unless the context clearly dictates otherwise. In the present application, the terms such as "consists of" or "includes" should not be construed as necessarily including all of the various components or steps described in the specification, and it should be interpreted that some of the components or steps may not be included, or additional components or steps may be included.

Throughout the specification, when referred to as "A and/or B", this means A, B or A and B, unless specifically stated to the contrary, and when referred to as "C to D", this means unless specifically stated to the contrary. Unless there is one, it means that it is C or higher and D or lower.

Hereinafter, the present invention will be described with reference to the drawings for explaining the plant cultivator according to the embodiments of the present invention.

Figure 2:
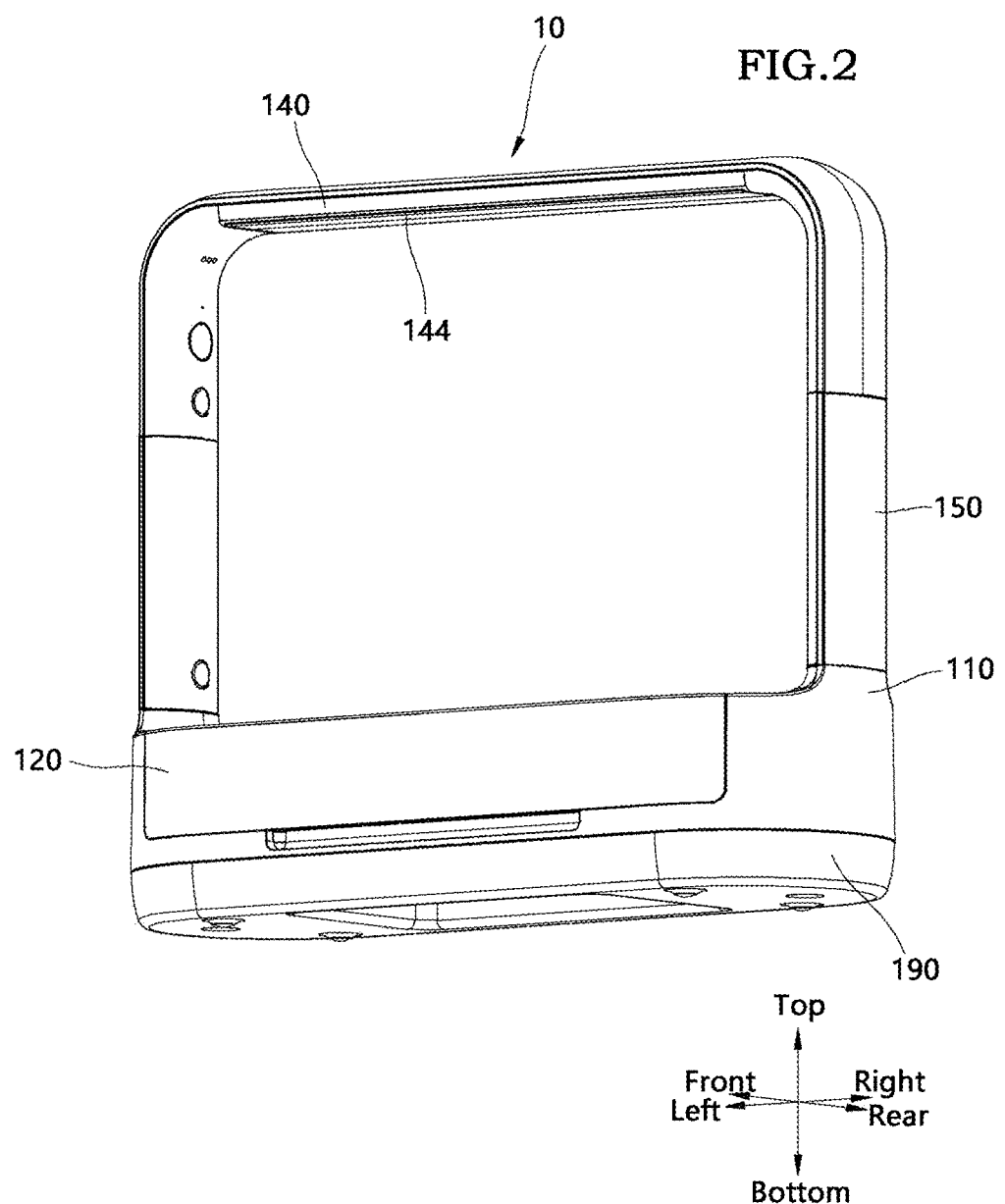
FIG. 2 is a front perspective view of the plant cultivator illustrated in FIG. 1.
Figure 3:
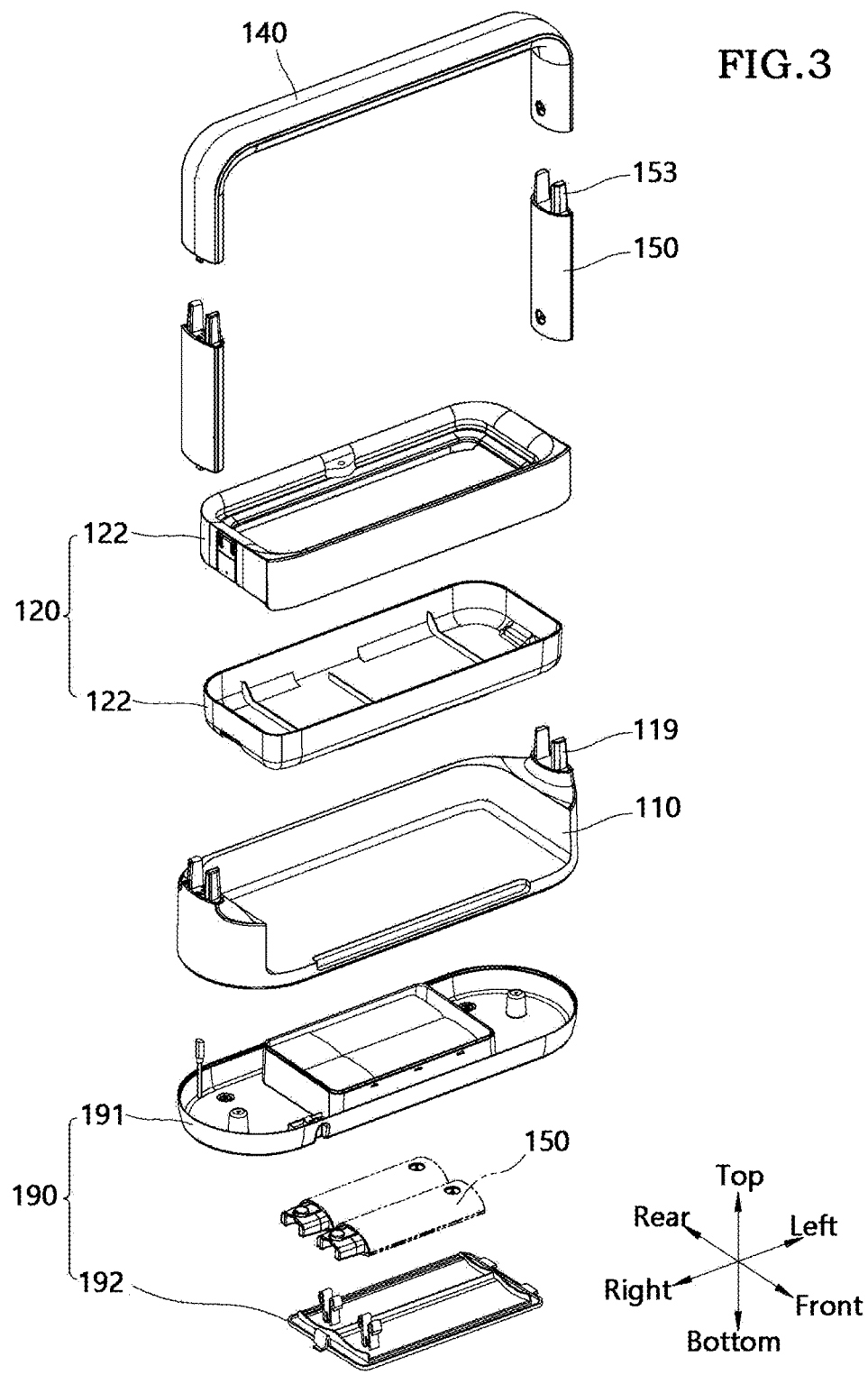
FIG. 3 is an exploded perspective view of the plant cultivator illustrated in FIG. 1.

FIG. 1 is a rear perspective view of a plant cultivator according to an embodiment of the present invention, FIG. 2 is a front perspective view of the plant cultivator illustrated in FIG. 1, and FIG. 3 is an exploded perspective view of the plant cultivator illustrated in FIG. 1.

A plant cultivator 10 according to an embodiment of the present invention may include a water tank part 120 on which a cultivation pot part 130 provided with at least one medium for plant growth is disposed and which stores water to be supplied to the medium, a main body part 110 on which the water tank part 120 is seated, a handle part 140 disposed above the main body part 110 and provided with a lighting device, a spacer 150 connecting the handle part 140 to the main body part 110, and a storage part 190 provided below the main body part 110 to accommodate the spacer 150.

As described above, the plant cultivator 10 according to the present invention is an open type, not a closed type.

Thus, at least a top surface of the cultivation pot part 130, in which plants are cultivated and grown, is exposed to an indoor environment, that is, indoor air. In more detail, the top surface of the cultivation pot part 130 is entirely opened and exposed to the indoor environment in consideration of characteristics of the plants that are generally grown in an upward direction opposite to a direction of gravity.

In addition, in the present invention, the cultivation pot part 130 is modularized to be compatible with a closed type plant cultivator.

That is, after germinating seeds in the plant cultivator 10 of the present invention, the cultivation pot part 130 may move to be disposed in the closed type plant cultivator that is capable of providing a better cultivation environment to grow the plants.

Conversely, the cultivation pot part 130, which is being used in the closed type plant cultivator, may move to the plant cultivator 10 to grow the plants. As will be described later, since a height of the handle part 140 provided with a lighting device of the present invention may be adjusted, it may be preferably applied in a case in which plants that are difficult to be grown in the closed type plant cultivator due to the growth height of the plants move to the plant cultivator 10 to be grown.

the cultivation pot part 130 may be assembled and seated in the water tank part 120, which will be described later, in a non-coupling manner.

Here, the meaning of being assembled to the water tank part 120 in the non-coupling manner means that the cultivation pot part 130 is capable of being coupled to the water tank part 120 without a separate coupling means, and in the assembled and seated state, the cultivation pot part 130 does not move by itself due to its own weight, but has a structure that is capable of being easily separated without separate disassembly.

The cultivation pot part 130 may be supported in a direction of gravity on the water tank part 120 and be assembled in a manner in which the cultivation pot part 130 is simply mounted on the water tank part 120.

Therefore, when a user wants to move the cultivation pot part 130 to the closed type plant cultivator or separate the cultivation pot part 130 from the water tank part 120 for water replenishment, the user may simply lift the cultivation pot part 130 upward without a separate disassembly operation to separate the cultivation pot part 130. Thus, user convenience may be improved.

The cultivation pot part 130 may be provided with a plurality of media to support the plants and protect roots of the plants.

The medium may be made of a predetermined porous material that is easy to absorb water and is advantageous for growth of the plant roots. Since any configuration known in the art is applied to the medium, description of the detailed configuration will be omitted.

In this embodiment, it has been described that the cultivation pot part 130 in the form of a package, in which the media and seeds are contained in a case, is used, but it is also possible to insert only the media into the water tank part 120 and use the media. Therefore, the cultivation pot part 130 may refer to the same object as the medium according to an embodiment.

The water tank part 120 disposed below the cultivation pot part 130 may mount the cultivation pot part 130 and serve to support the cultivation pot part 130 and store water to be supplied to the plants.

The water tank part 120 may include a water tank body 121 that stores water, and a water tank cover 122 that supports the cultivation pot part 130 in a mounting manner.

The water tank part 120 may have an overall rectangular parallelepiped shape, of which a left and right width is greater than a front and rear width, and may have a vertical height that is sufficient to accommodate the cultivation pot part 130 therein.

The water tank part 120 may be made of a lightweight material while maintaining predetermined strength. Preferably, the water tank body 121 and the water tank cover 122 of the water tank part 120 may be manufactured through plastic injection molding.

Here, the water tank body 121 and the water tank cover 122 that constitute the water tank part 120 may be made of an opaque plastic material.

A front surface of the water tank 120 may be directly exposed to the outside when coupled to a main body part 110, which will be described later, to define a portion of a front surface of the plant cultivator 10. Here, the front surface of the water tank part 120 may define a continuous surface with a circumferential surface of the main body part 110 to provide a sense of unity.

The water tank part 120 is assembled to the main body part 110 in a non-coupling manner that is similar to that of the cultivation pot part 130 described above. Thus, it may be seated on the main body part 110 without a separate coupling means. The water tank part 120 is detachable from the main body part 110.

Thus, the user may separate the water tank part 120 from the main body part 110 or seat the water tank part 120 on the main body part 110 without any additional manipulation.

When attempting to separate the water tank 120 in the state in which the water tank 120 is seated on the main body part 110, the user may easily lift and separate the water tank 120 while holding the water tank part 120 through the withdrawing operation.

A groove may be defined in the main body part 110 at a boundary portion with the water tank 120 to enable the user to effectively hold the main body part 110.

The main body part 110 disposed below the water tank 120 accommodates the water tank 120 and supports the handle part 140, which will be described later.

The main body part 110 has a shape in which a width in a left and right direction is greater than a width in a front and rear direction to correspond to the water tank part 120 as a whole, and each of both left and right surfaces has an arcuate shape with a predetermined curvature.

In order for the water tank 120 to be seated, upper and front portions of the main body part 110 are mostly opened to correspond to the shape of the water tank 120. A rear surface of the main body part 110 is blocked to define a rear surface of the plant cultivator 10. Backward movement of the water tank part 120 may be blocked by the rear surface of the main body part 110.

The main body part 110 supports the handle part 140 at both left and right sides thereof. A main body insert 119 supporting the handle part 140 or the spacer 150 is provided on each of both left and right sides of the main body part 110. The main body insert 119 is provided in a pair and is disposed to protrude upward on each of both the sides of the main body part 110. The protruding portion of the main body insert 119 is inserted into the handle part 140 or the spacer 150 to support the handle part 140 or the spacer 150 so that the handle part 140 and the spacer 150 are not shaken in a horizontal direction.

The storage part 190 is coupled to a lower side of the main body part 110.

The spacer 150 may be connected between the handle part 140 and the main body part 110. The spacer 150 is used to adjust a height of the handle part 140. The spacer 150 are provided in a pair to connect left and right lower ends of the handle part 140 and left and right upper ends of the main body part 110.

The spacer 150 includes a spacer insert 153 that supports the handle part 140. The spacer insert 153 is disposed to protrude in the longitudinal direction from one end of the spacer 150.

The spacer insert 153 may be provided in the same shape as the main body insert 119 described above so that the handle part 140 is coupled to the main body part 110 even if the spacer 150 is separated.

The handle part 140 may be provided with a lighting device that irradiates light toward the cultivation pot part 130, and a height of the lighting device of the handle part 140 may be adjusted through the spacer 150. That is, it is possible to adjust a height of the lighting device of the handle part 140 according to a growth height of the plant using the spacer 150.

The handle part 140 provides a handle function that is capable of being held by the user when moving the plant cultivator 10. In addition, the handle part 140 additionally performs a function of providing the lighting device that irradiates light toward the cultivation pot part 130. Thus, the handle part 40 may be referred to as a housing or holder of a light source part 60 in consideration of its relationship to the light source part 60. Hereinafter, for convenience, a member that serves to accommodate and support the light source part 60 will be referred to as the handle part 40 and will be described.

The handle part 140 is provided in a bar shape disposed across an upper side of the main body part 110 in the longitudinal direction in the left and right direction. Both left and right sides of the handle part 140 extend downward. The handle part 140 is constituted by a long horizontal portion in the left and right direction and a pair of vertical portions extending downward from both ends. Lower ends of both the left and right sides of the handle part 140 are coupled to the main body part 110 or the spacer 150.

The storage part 190 is coupled to a lower side of the main body part 110 to supports the main body part 110. The storage part 190 is coupled to the main body part 110 using a coupling means such as a bolt so that the user does not easily separate the storage part 190. The storage part 190 defines an outer appearance of the lower portion of the plant cultivator 10. An upper circumference of the storage part 190 is aligned with a lower circumference of the main body part 110 so as to provide a sense of unity with the main body part 110.

The storage part 190 includes a storage body 191, which is recessed upward from a lower side to define a space in which the spacer 150 is accommodated, and a storage cover 192 that is detachably coupled to a lower side of the storage body 191. The spacer 150 is mounted on the storage cover 192, and the storage cover 192 on which the spacer 150 is mounted is coupled to the storage body 191 so that the spacer 150 is accommodated in the storage body 191.

Figure 4:
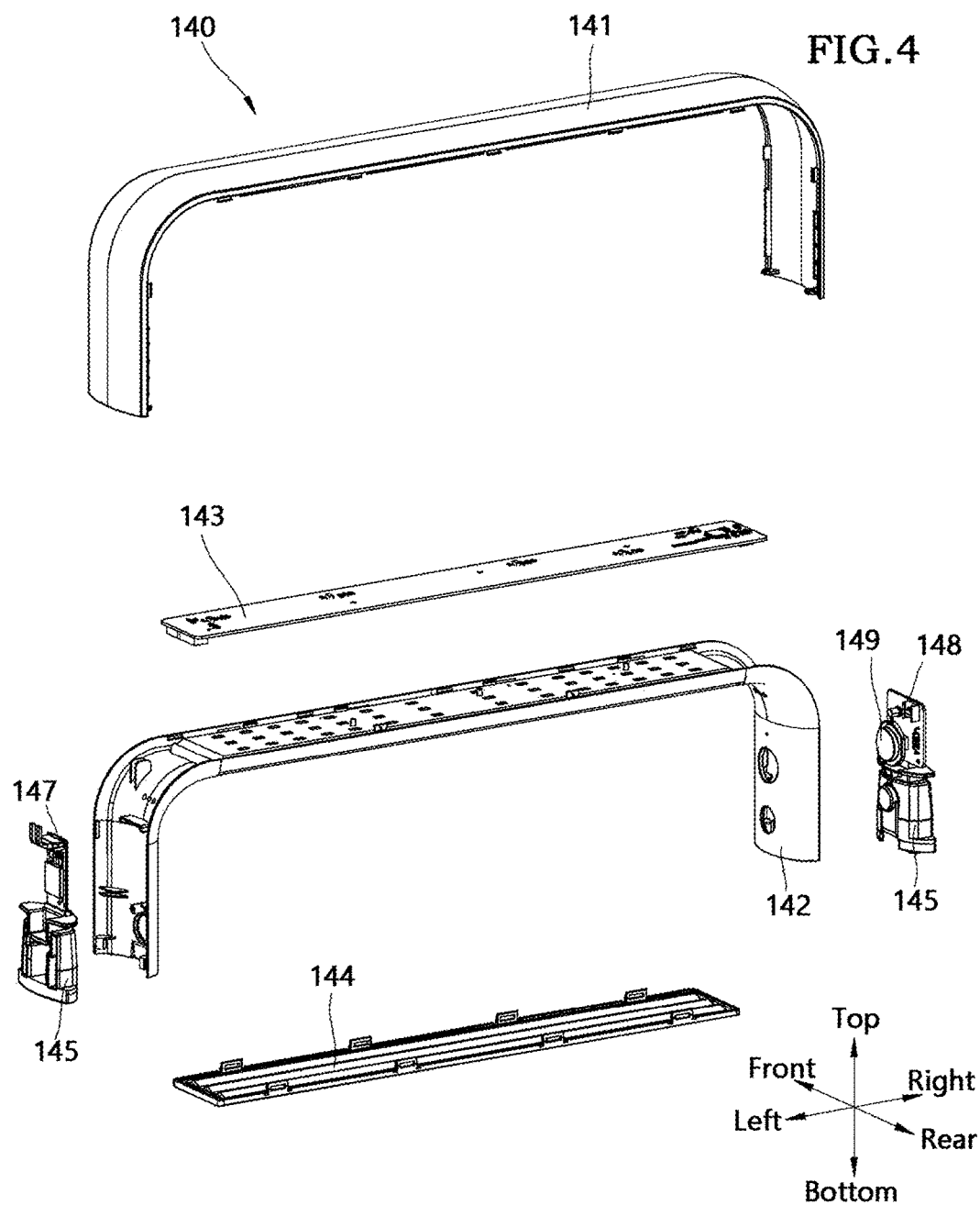
FIG. 4 is an exploded perspective view illustrating a handle part of the plant cultivator illustrated in FIG. 1.
Figure 5:
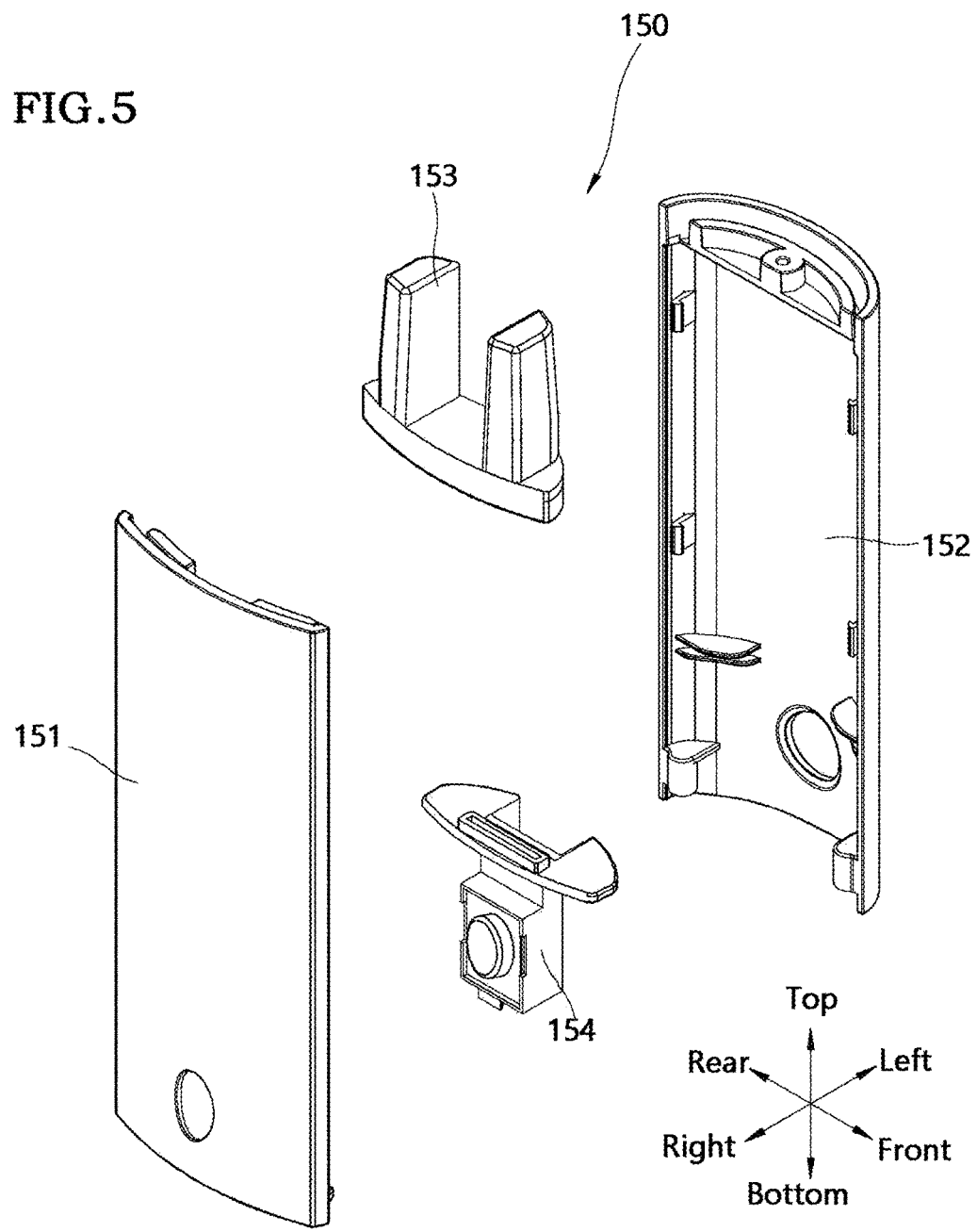
FIG. 5 is an exploded perspective view illustrating a spacer of the plant cultivator illustrated in FIG. 1.

FIG. 4 is an exploded perspective view illustrating the handle part of the plant cultivator illustrated in FIG. 1.

The handle part 140 includes an upper handle part 141 defining an outer appearance of an upper side thereof, a lower handle part 142 defining an outer appearance of a lower side thereof, a main circuit board 143 provided with the lighting device and a controller, a lighting device cover 144 through which light irradiated from the lighting device is transmitted, an input button 149 receiving an operation command from the user, a sub-circuit board 148 converting pushing of the input button 149 into a signal, a wireless communication module 147 wirelessly communicating with an external device, and a handle coupling part 145 through which the handle part 140 is coupled to and separated from the main body part 110 or the spacer 150.

The upper handle body 141 and the lower handle body 142 are vertically divided bodies of the handle part 140 and define the exterior of the handle part 140. The upper handle body 141 and the lower handle body 142 are constituted by a long horizontal portion in the left and right direction and a pair of vertical portions extending downward from both ends.

When the upper handle body 141 and the lower handle body 142 are coupled to each other, a space is defined therebetween, and the main circuit board 143, the sub-circuit board 148, the wireless communication module 147, and the handle coupling part 145 are accommodated therein.

The main circuit board 143 is provided to be elongated in the left and right direction to correspond to most of the horizontal portion of the handle part 140. Elements that control an overall operation of the plant cultivator such as a controller and a memory are mounted on the main circuit board 143. A lighting device module that irradiates light is mounted on the main circuit board 143.

The lighting device module includes a light-emitting diode (LED) that generates light by converting electrical energy, and a driving part. A plurality of light-emitting diodes are arranged on a bottom surface of the main circuit board 143. The light generated from the light-emitting diode passes through a plurality of holes defined in the lower handle body 142 and then passes through the lighting device cover 144 so as to be irradiated to the cultivation pot part 130. The light generated from the lighting device module may be white light and/or red light having a wavelength range suitable for the plant growth.

The lighting device cover 144, like the main circuit board 143, is provided to be elongated in the left and right direction to correspond to most of the horizontal portion of the handle part 140. Since the light emitted from the light-emitting diode of the lighting device module has too strong straightness, the lighting device cover 144 disperses the light and directs the light toward the cultivation pot part 130. That is, the light generated from the light-emitting diode of the lighting device module is surface-emitted from the lighting device cover 144 and is irradiated to the cultivation pot part 130.

The lighting device cover 144 is coupled to a bottom surface of the horizontal portion of the lower handle body 142.

The user may press the input button 149 to input the operation command to the plant cultivator 10. The user may press the input button 149 to turn power on and off, change an operation mode, turn the lighting device module on or off, or turn the wireless communication of the wireless communication module 147 on or off. The input button 149 is disposed to partially protrude from the vertical portion of one side of the lower handle body 142. The input button 149 is configured so that a piezoelectric element mounted on the sub-circuit board 148 is pressed when pressed.

The sub-circuit board 148 is disposed at a side of the vertical portion of the handle part 140, at which the input button 149 is disposed. The piezoelectric element that changes the pushing of the input button 149 into a signal, an indicator lighting device that displays a status of the plant cultivator 10 or wireless communication using light, and a sensor such as temperature sensor are mounted on the sub-circuit board 148.

The wireless communication module 147 is disposed at a side of the vertical portion of the handle part 140, at which the sub-circuit board 148 is not disposed. The wireless communication module 147 may, for example, be a WiFi module capable of two-way access to the Internet network. The wireless communication module 147 may be electrically connected to the main circuit board 143, and the controller of the main circuit board 143 may communicate with a user's portable terminal through the wireless communication module 147.

The operation of the wireless communication module 147 may be indicated through the indicator lighting device connected to the sub-circuit board 148.

The handle coupling part 145 is configured to allow the handle part 140 to be coupled to or separated from the main body part 110 or the spacer 150. The handle coupling part 145 may include a handle coupling hook engaged with the main body part 110 or the spacer 150, a handle coupling button through which the handle coupling hook is released when pressed, and a handle elastic body providing elasticity to the handle coupling hook and the handle coupling button. The handle coupling part 145 is provided in a pair and is disposed on each of the vertical portions at both sides of the handle part 140. The handle coupling button of the handle coupling part 145 is disposed to partially protrude from the vertical portion of the lower handle body 142.

The above-described handle coupling part 145 is provided in the same or similar structure to the spacer 150 and is coupled to the spacer 150 in the same manner as the main body part 110 to be coupled to the handle part 140.

Figure 6:
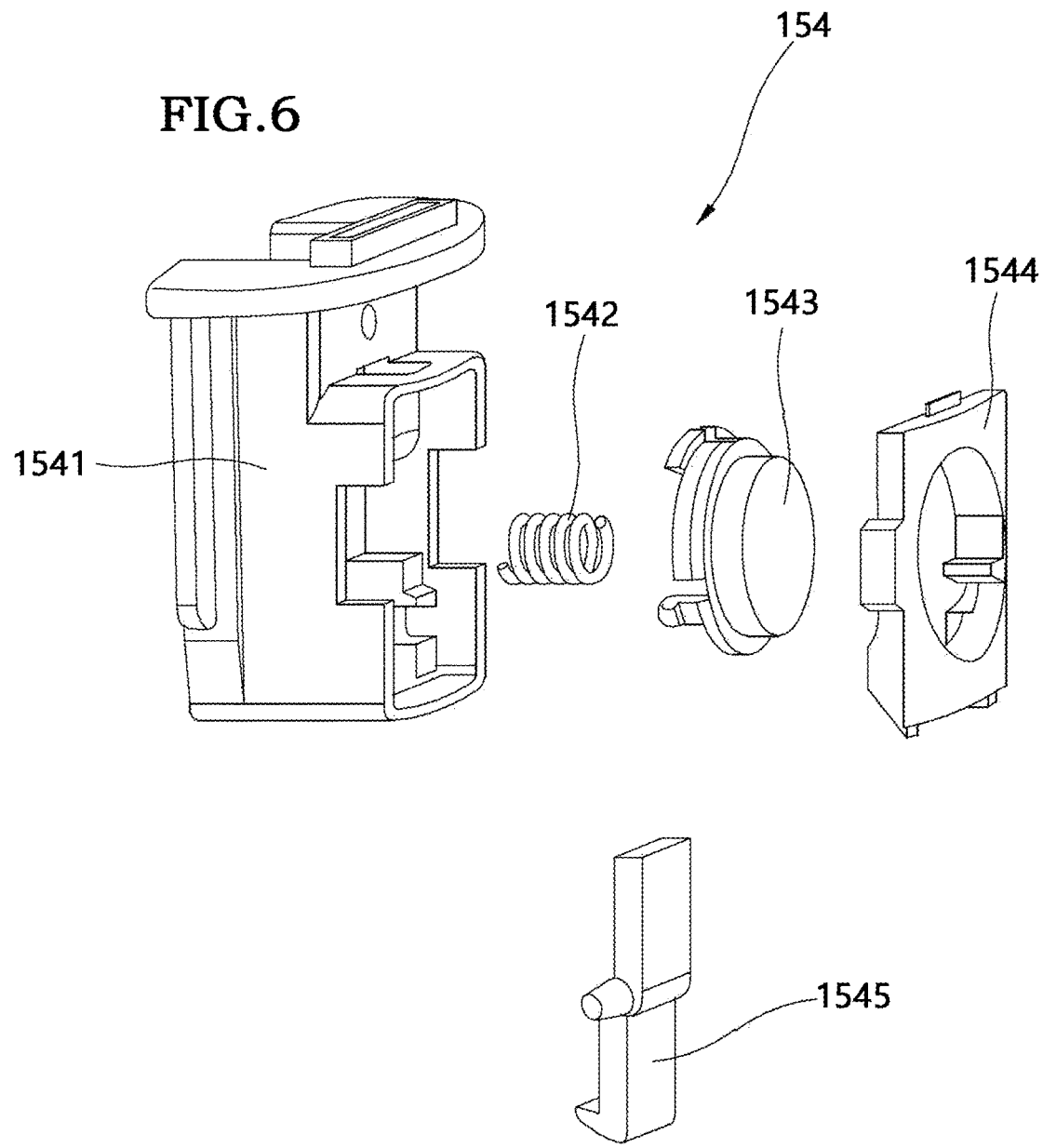
FIG. 6 is an exploded perspective view illustrating a spacer coupling part of the spacer illustrated in FIG. 1.
Figure 7:
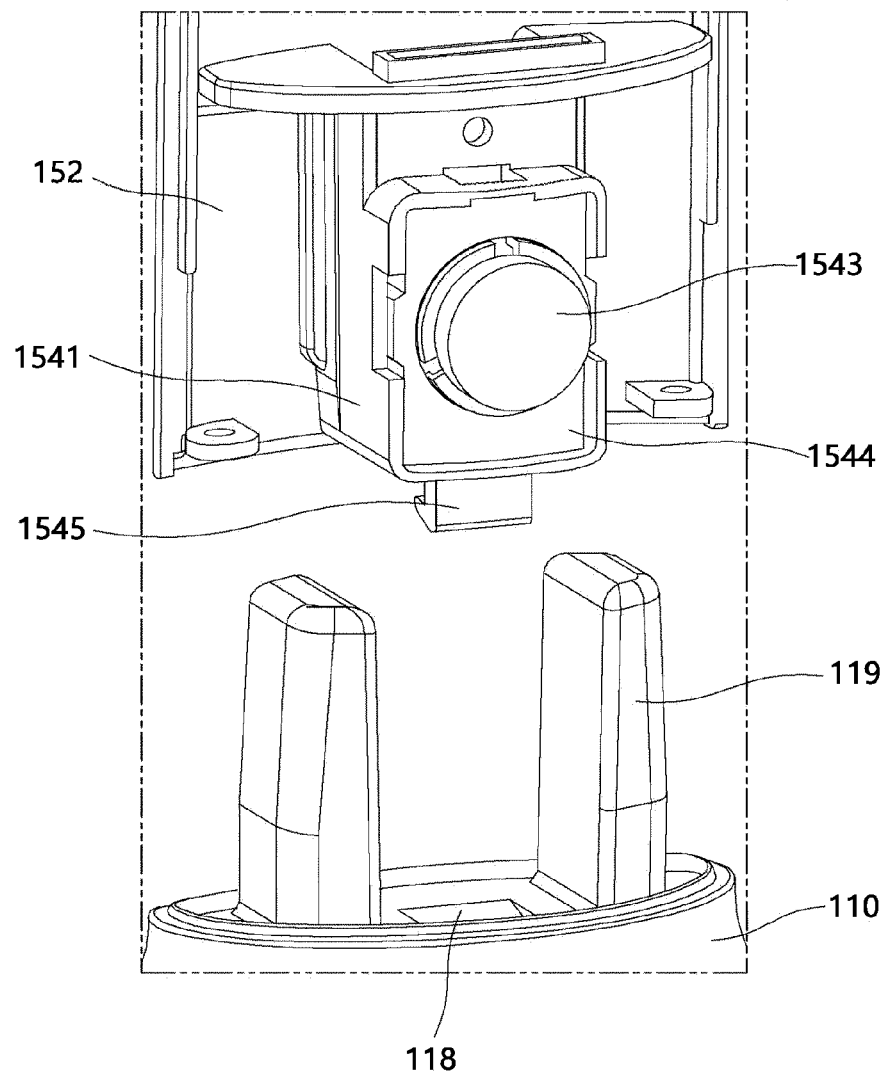
FIGS. 7 and 8 are partial perspective views illustrating the spacer and a main body part of the plant cultivator illustrated in FIG. 1.
Figure 8:
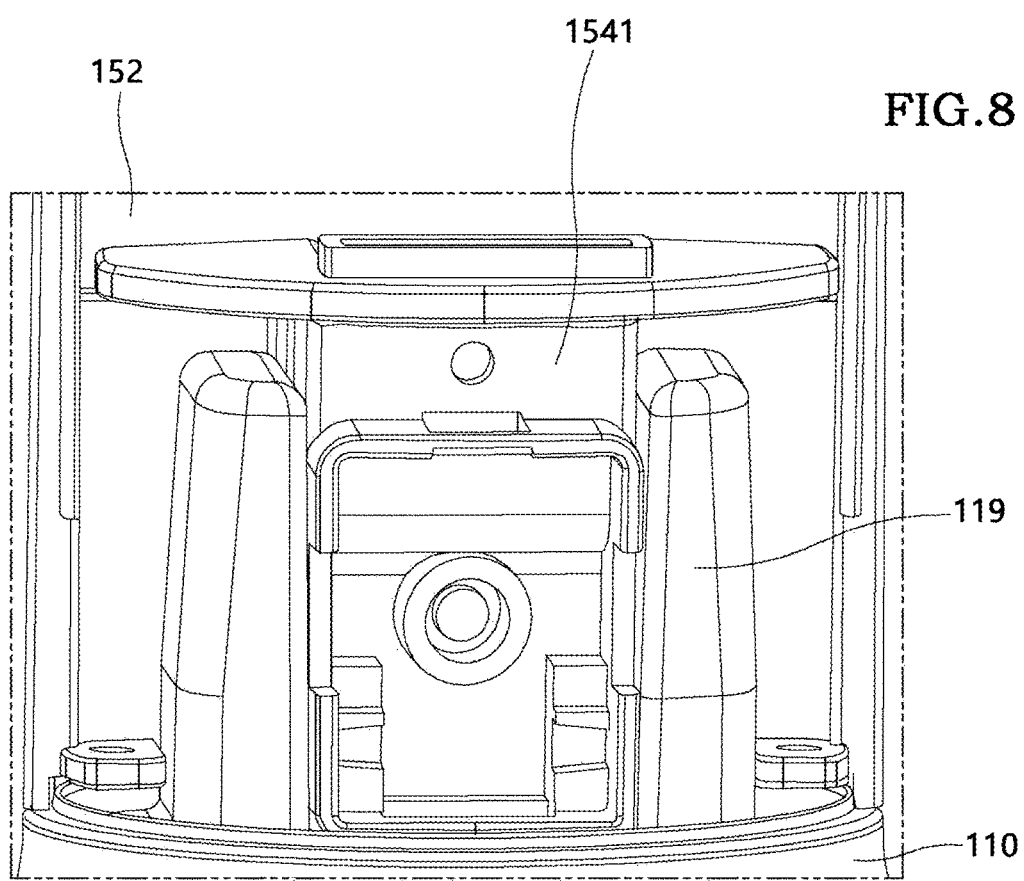
Figure 9:
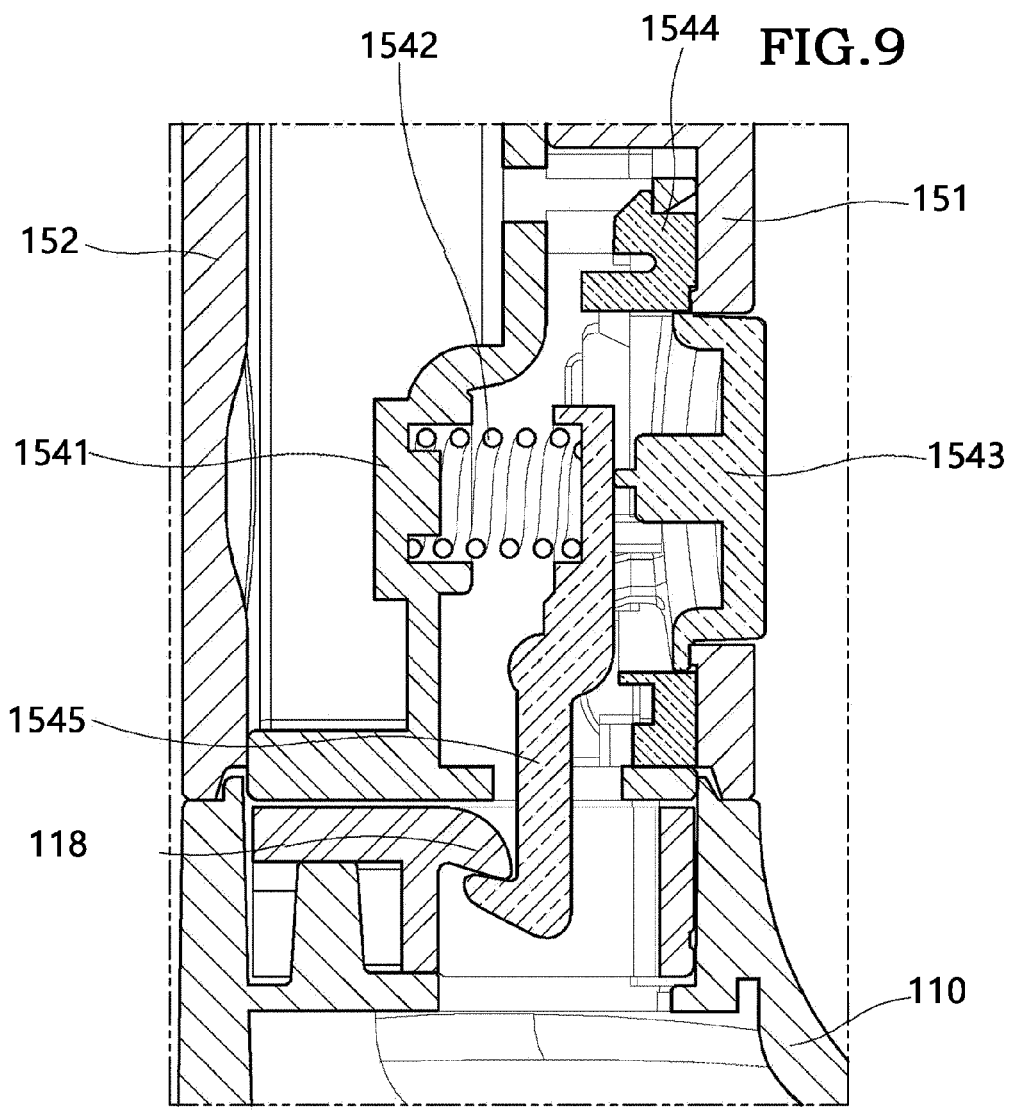
FIG. 9 is a partial cross-sectional view of the plant cultivator illustrated in FIG. 1.

FIG. 6 is an exploded perspective view illustrating the spacer coupling part of the spacer illustrated in FIG. 1, FIGS. 7 and 8 are partial perspective views illustrating the spacer and a main body part of the plant cultivator illustrated in FIG. 1, and FIG. 9 is a partial cross-sectional view of the plant cultivator illustrated in FIG. 1.

The spacer 150 according to an embodiment of the present invention includes an inner spacer body 151 defining an outer appearance of one surface thereof, an outer spacer body 152 defining an outer appearance of the other surface, a spacer insert 153 disposed on an upper end and inserted into the handle part 140, and a spacer coupling part 154 coupled to the main body part 110.

The inner spacer body 151 and the outer spacer body 152 are horizontally divided bodies of the spacer 150 and define an outer appearance of the spacer 150.

The inner spacer body 151 has a rod shape that is elongated in the vertical direction and has a parabolic cross-section. The inner spacer body 151 defines an inner appearance of the spacer 150 when the spacer 150 is connected to the handle part 140 and the main body part 110 and is disposed toward the inside of the plant cultivator 10. A hole is defined in the inner spacer body 151 through which the spacer coupling button 1543 of the spacer coupling part 154, which will be described later, protrudes.

The outer spacer body 152 has a rod shape that is elongated in the vertical direction and has a parabolic cross-section. The outer spacer body 152 defines an outer appearance of the spacer 150 when the spacer 150 is connected to the handle part 140 and the main body part 110 and is disposed toward the outside of the plant cultivator 10.

A cross-sectional curvature of the outer spacer body 152 is greater than that of the inner spacer body 151. When the spacer 150 is accommodated in the storage part 190, the outer spacer body 152 is disposed at a lower end thereof, and the inner spacer body 151 is disposed at an upper side thereof. That is, when the spacer 150 is accommodated in the storage part 190, the outer spacer body 152 is seated on the storage cover 192. The outer spacer body 152, which has a larger curvature, may be seated on the storage cover 192 and be safely stored in the storage part 190.

When the inner spacer body 151 and the outer spacer body 152 are coupled to each other, a space is defined between the inner spacer body and the outer spacer body to accommodate the spacer coupling part 154, and a lower portion of the outer spacer body 152 is coupled to an upper end, and the main body insert 119 is inserted into a lower end when the spacer 150 and the main body part 110 are connected to each other.

The spacer insert 153 is coupled to an upper end of each of the inner spacer body 151 and the outer spacer body 152, and the upper portion of the spacer insert 153 protrudes in a longitudinal direction of the spacer 150. An upper portion of the spacer insert 153 is inserted into the handle part 140 when the spacer 150 and the handle part 140 are connected to support the handle part 140 so as not to be shaken in the horizontal direction. The upper portion of the spacer insert 153 is coupled to the storage cover 192 when the spacer 150 is accommodated in the storage part 190.

The upper portion of the spacer insert 153 is provided in the shape of a pair of horns. Each of the pair of horns of the spacer insert 150 is provided in a shape of which a cross-section decreases upward to facilitate the insertion of the handle part 140. The pair of horns of the spacer insert 150 are provided so that surfaces facing each other thereof are flat, and are guided by a side surface of the handle coupling part 145 when the handle part 140 is inserted.

A wedge-shaped spacer coupling end is provided at a lower portion of the spacer insert 153, and the handle coupling hook of the handle coupling part 145 described above is hooked.

The spacer coupling part 154 is configured to allow the spacer 150 to be coupled to the main body part 110. The spacer coupling part 154 includes a spacer coupling body 1541, a spacer coupling hook 1545 engaged with the main body part 110, a spacer coupling button 1543 through which the spacer coupling hook 1545 is released when pressed, a spacer elastic body 1542 providing elasticity to the spacer coupling button 1543, and a spacer coupling cover 1544 coupled to the spacer coupling body 1541.

The spacer coupling body 1541 is provided in a rectangular parallelepiped shape as a whole. The spacer coupling body 1541 is coupled to the spacer coupling cover 1544 to accommodate the spacer coupling hook 1545, the spacer coupling button 1543, and the spacer elastic body 1542 therein.

Both surfaces of the spacer coupling body 1541 are provided to be flat in the vertical direction to guide the main body insert 119 when the main body insert 119 is inserted into the spacer 150.

An upper portion of the spacer coupling hook 1545 is in contact with the spacer elastic body 1542 and the spacer coupling button 1543, and a hook is provided at a lower portion of the spacer coupling hook 1545. The spacer coupling hook 1545 rotates using a middle end thereof as a rotation axis. The middle end of the spacer coupling hook 1545 is rotatably coupled to the spacer coupling body 1541.

A wedge-shaped main body coupling end 118 is provided on the main body insert 119, and a lower hook of the spacer coupling hook 1545 is hooked with the main body coupling end 118.

The spacer elastic body 1542 may be implemented with various materials or structures that provide elastic force, and in this embodiment, the spacer elastic body 1542 is a spring. One end of the spacer elastic body 1542 is in contact with the spacer coupling body 1541, and the other end of the spacer elastic body 1542 is in contact with an upper portion of the spacer coupling hook 1545.

One surface of the spacer coupling button 1543 is in contact with the upper portion of the spacer coupling hook 1545, and the other surface is exposed to the outside of the inner spacer body 151. When the user presses the spacer coupling button 1543, the spacer coupling hook 1545 rotates and the hooking of the spacer coupling hook 1545 is released from the main body coupling end 118.

The handle coupling part 145 may have the same structure as the spacer coupling part 154 described above, and thus, the handle part 140 may be coupled to the main body part 110 even if the spacer 150 is separated.

Figure 10:
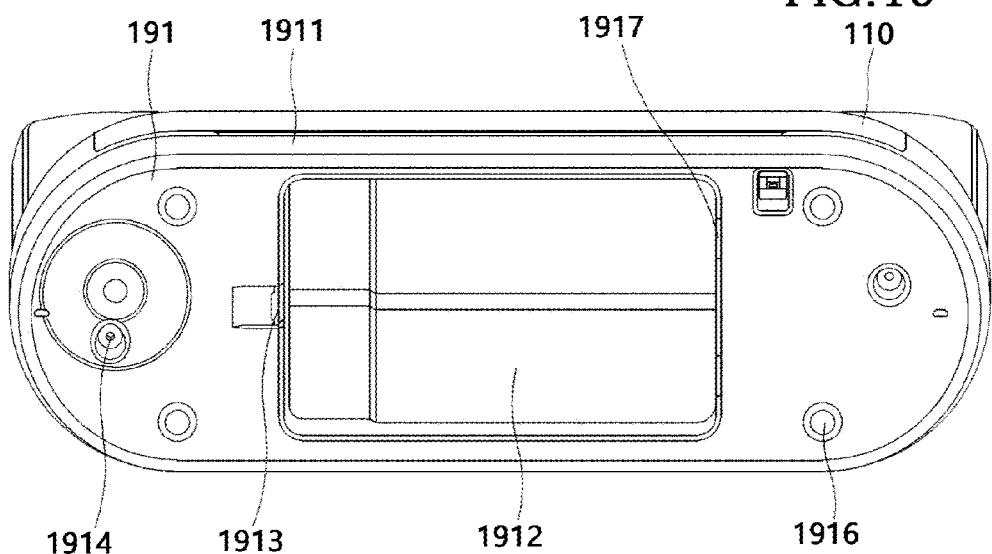
FIG. 10 is an exploded perspective view illustrating a storage part of the plant cultivator illustrated in FIG. 1.
Figure 11:
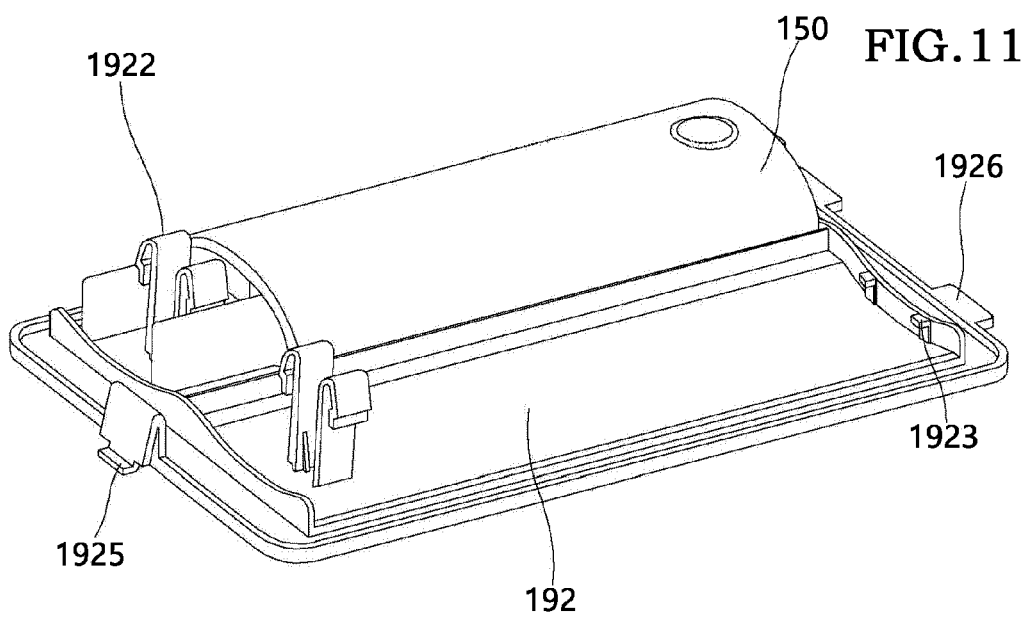
FIG. 11 is a perspective view illustrating a storage cover of the storage part illustrated in FIG. 10.
Figure 12:
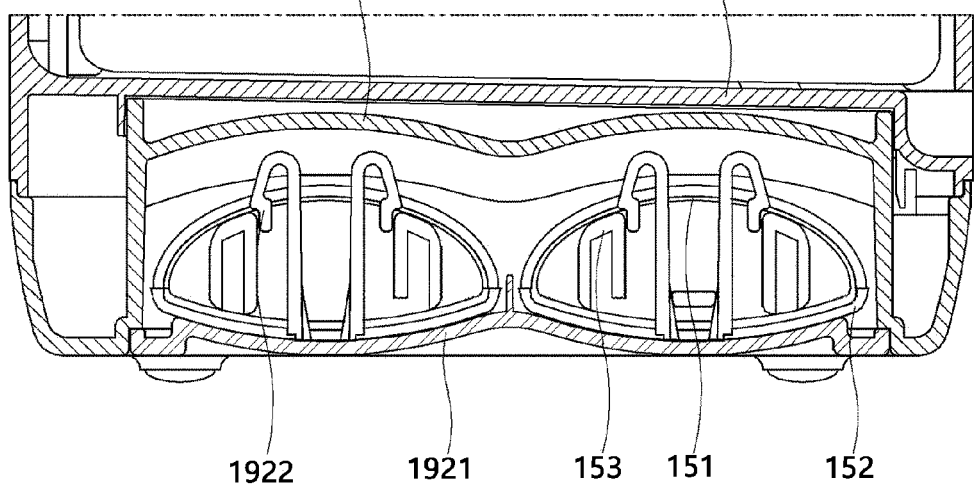
FIG. 12 is a cross-sectional view of the storage part illustrated in FIG. 10.

FIG. 10 is an exploded perspective view illustrating the storage part of the plant cultivator illustrated in FIG. 1, FIG. 11 is a perspective view illustrating the storage cover of the storage part illustrated in FIG. 10, and FIG. 12 is a cross-sectional view of the storage part illustrated in FIG. 10.

The storage body 191 includes a body base 1911 on which a spacer accommodation part 1912 that is a space for accommodating the spacer 150, is defined, a power socket 1914 through which external power is input, and a rubber pad 1916 that is in contact with a surface or bottom on which the plant cultivator 10 is disposed to prevent the plant cultivator 10 from being slid.

The body base 1911 has a shape in which a width in a left and right direction is greater than a width in a front and rear direction to correspond to the main body part 110 as a whole, and each of both left and right surfaces has an arcuate shape with a predetermined curvature. An upper portion of the body base 1911 is coupled to the main body part 110, and a lower part of the body base 1911 is disposed on the surface or bottom on which the plant cultivator 10 is disposed.

The spacer accommodation part 1912 that is recessed upward from a lower side is provided at a middle portion of the body base 1911. The spacer accommodation part 1912 has a height and width that are sufficient to accommodate the spacer 150 mounted on the storage cover 192 and the insert hook 1922 of the storage cover 192. The height of the spacer accommodation part 1912 is provided to be greater than that of the insert hook 1922. The width of the spacer accommodation part 1912 in the left and right direction is provided to be greater than a longitudinal length of the spacer 150. Since a pair of spacers 150 are accommodated in the spacer accommodation part 1912, the front and rear width of the spacer accommodation part 1912 is provided to be greater than twice the longest thickness of the spacer 150.

An edge of the spacer accommodation part 1912 has a rectangular shape of which a length in the left and right direction is greater than a length in the front and rear direction. A partial cross-section of a top surface of the spacer accommodation part 1912 has a parabolic shape. The top surface of the spacer accommodation part 1912 is provided so that at least a portion of the spacer accommodation part 1912 is aligned with the inner spacer body 151 of the spacer 150 even if not completely aligned with the inner spacer body 151 of the spacer 150, thereby preventing a gap from being generated when the spacer 150 is accommodated.

A cover hook groove 1913 coupled to the cover hook 1925 is defined at a side of an edge of the spacer accommodation part 1912, at which the power socket 1914 is disposed. In addition, a cover protrusion groove 1917 into which a cover protrusion 1926 is inserted is provided on the edge of the spacer accommodation part 1912, which is opposite to the side at which the power socket 1914 is disposed.

The power socket 1914 is disposed to be biased to one side of the body base 1911 in the left and right direction. Since the spacer accommodation part 1912 is provided at a center of the body base 1911, the power socket 1914 is disposed to be biased so as to avoid the spacer accommodation part 1912. Even if there is water on the surface or bottom on which the plant cultivator 10 is disposed, an area around the power socket 1914 of the body base 1911 is inserted upward to prevent the water from being easily introduced into the power socket 1914.

The rubber pad 1916 is provided in plurality and disposed on a bottom surface of the body base 1911. Four rubber pads 1916 are provided to be disposed at four edges of the body base 1911. The rubber pad 1916 separates the bottom surface of the body base 1911 from the surface or bottom on which the plant cultivator 10 is disposed to define a space through which a power line connected to the power socket 1914 passes.

The storage cover 192 is detachably coupled to the edge of the spacer accommodation part 1912 on the bottom surface of the storage body 191 to cover the spacer accommodation part 1912. The storage cover 192 opens and closes the opened bottom surface of the spacer accommodation part 1912.

The storage cover 192 includes a cover base 1921 on which the spacer 150 is seated, an insert hook 1922 that protrudes upward from the cover base 1921 and is coupled to the spacer insert 153, a spacer protrusion 1923 inserted into the spacer 150, a cover hook 1925 engaged with the storage body 191, and a cover protrusion 1926 engaged with the storage body 191.

The cover base 1921 is provided in a rectangular shape of which a length in the left and right direction is greater than a length in the front and rear direction. The cover base 1921 has an area on which the pair of spacers 150 are seated. A portion of the cover base 1921, at which the spacer 150 is seated, is provided to be aligned with the outer spacer body 152 of the spacer 150. A partial cross-section of the portion of the cover base 1921 at which the spacer 150 is seated is provided in a parabolic shape. When the spacer 150 is stored, a portion of the cover base 1921 at which the spacer 150 is seated is provided so that a longitudinal direction of the spacer 150 matches a longitudinal direction (left and right direction) of the horizontal portion of the handle part 140.

A partition wall is disposed at a portion on which the spacer 150 of the cover base 1921 is seated in a direction perpendicular to the longitudinal direction of the spacer 150 so that the spacer 150 does not move in the longitudinal direction.

The insert hook 1922 is a portion that is manipulated by the user so that the spacer 150 is coupled to and separated from the storage cover 192. The insert hook 1922 protrudes upward from the cover base 1921 and extends downward from an upper end to provide a protrusion at the end thereof. The insert hook 1922 has a curved portion extending downward from the upper end thereof. When the spacer 150 is installed, a horn of the spacer insert 153 is slid along the curved portion and is hooked with the protrusion at the end. The insert hook 1922 is inserted and coupled between a pair of horns of the spacer insert 153. The insert hook 1922 is provided in a pair and is coupled to each of the pair of horns of the spacer insert 153. Since two spacers 150 are mounted on the storage cover 192, two pairs of insert hooks 1922 are provided.

The spacer protrusion 1923 is provided to protrude in the horizontal direction from the partition wall of the cover base 1921 at a side opposite to the side at which the insert hook 1922 is provided. When the spacer 150 is installed, the spacer protrusion 1923 is inserted into the end of the spacer 150 at the opposite side of the spacer insert 153 (i.e., the side at which the main body insert 119 is inserted).

A cover hook 1925 engaged with the cover body 191 is provided at one side of the cover base 1921. The cover hook 1925 is disposed at the side, at which the insert hook 1922 is provided, on the edge of the cover base 1921. The cover hook 1925 is a portion that is manipulated by the user so that the storage cover 192 is coupled to and separated from the storage body 191. The cover hook 1925 is inserted into the cover hook groove 1913 of the storage body 191 and is hooked around the cover hook groove 1913.

The cover protrusion 1926 is disposed at the side of the edge of the cover base 1921, which is opposite to the side at which the cover hook 1925 is disposed. The cover protrusion 1926 is provided to extend horizontally outward from the cover base 1921. The cover protrusion 1926 is inserted into the cover projection groove 1917 of the storage body 191.

When coupling or removing the storage cover 192, the storage cover 192 rotates in the state in which the cover protrusion 1926 is inserted into the cover protrusion groove 1917, and the cover hook 1925 is hooked with the cover hook groove 1913, or the hooking of the cover hook 1925 is released from the cover hook groove 1913. The storage cover 192 rotates around the portion at which the cover protrusion 1926 is provided to be coupled to or separated from the storage body 191. Since the storage cover 192 is separated by rotating around the side at which the power socket 1914 is not disposed, when the storage cover 192 is separated, the water may be prevented from being introduced into the power socket 1914 even if the water stored in the water tank part 120 overflows.

Although the embodiments are exemplified with respect to the accompanying drawings, those having ordinary skill in the art to which the present invention pertains will be understood that the present invention can be carried out in other specific forms without changing the technical idea or essential features. In addition, although explaining the embodiments of the present invention and explaining the operation and effect according to the constitution of the present invention have not been explicitly described, it is needless to say that a predictable effect is also recognized by the constitution.

The invention claimed is:

1. A plant cultivator comprising:
   a cultivation pot part;
   a main body part on which the cultivation pot part is detachably disposed;
   a lighting device part configured to irradiate light toward the cultivation pot part;
   a housing disposed above the main body part and configured to accommodate the lighting device part;
   a spacer having one end detachably connected to the housing and the other end detachably connected to the main body part; and
   a spacer accommodation part disposed below the main body part,
   wherein the spacer accommodation part has an opened bottom surface and is configured to accommodate the spacer that is separated from the housing and the main body part.

2. The plant cultivator according to claim 1, further comprising a storage cover detachably coupled to the spacer accommodation part and configured to open and close the spacer accommodation part.

3. The plant cultivator according to claim 2, wherein the spacer is mounted on the storage cover.

4. The plant cultivator according to claim 3, wherein the spacer comprises a pair of spacer inserts protruding from one end of the spacer, and
   the storage cover comprises an insert hook coupled to the spacer inserts.

5. The plant cultivator according to claim 4, wherein the pair of spacer inserts extend in a longitudinal direction of the spacer from one end of the spacer, and
   the insert hook is inserted between the pair of spacer inserts.

6. The plant cultivator according to claim 4, wherein the storage cover further comprises a spacer protrusion inserted into the other end of the spacer.

7. The plant cultivator according to claim 2, wherein the storage cover further comprises a cover base on which the spacer is seated,
   the spacer comprises a spacer body extending between the one end and the other end in a longitudinal direction to define an outer appearance of the spacer, and
   a top surface of the cover base is at least partially aligned with an outer surface of the spacer body.

8. The plant cultivator according to claim 7, wherein a cross-section of the outer surface of the spacer body in a direction perpendicular to the longitudinal direction comprises a parabolic shape, and
   a cross-section of the top surface of the cover base in the direction perpendicular to the longitudinal direction has a parabolic shape.

9. The plant cultivator according to claim 8, wherein a cross-section of a top surface of the spacer accommodation part in the direction perpendicular to the longitudinal direction has a parabolic shape.

* * * * *